United States Patent [19]

Trumble

[11] 4,291,094
[45] Sep. 22, 1981

[54] PULP INSULATION REPAIR

[75] Inventor: William P. Trumble, Kanata, Canada

[73] Assignee: Northern Telecom Limited, Montreal, Canada

[21] Appl. No.: 89,226

[22] Filed: Oct. 29, 1979

[51] Int. Cl.³ .................. B32B 15/14; C08K 5/12
[52] U.S. Cl. .................. 428/380; 427/421; 260/31.8 R; 260/31.8 G
[58] Field of Search .......... 427/421; 260/31.8 R, 260/31.8 G; 428/380

[56] References Cited

U.S. PATENT DOCUMENTS 3,166,525 1/1965 Perry .................. 260/29.6 HN
3,231,407 1/1966 Mason ................. 427/421
3,502,743 3/1970 Wolf et al. ............ 260/29.6 HN
3,928,210 12/1975 Peterson .............. 260/29.2 TN Primary Examiner—John Kight, III
Assistant Examiner—Peter F. Kulkosky
Attorney, Agent, or Firm—R. J. Austin

[57] ABSTRACT

A compound for spray application onto pulp insulation on an electrical conductor, the compound comprising between 5 and 9 parts by weight of polyvinylpyrrolidone polyvinylacetate copolymer with 0.5 to 0.9 parts by weight of a copper corrosion inhibitor and 1.0 to 3.0 parts of a plasticizer. The compound is useful either to repair damaged pulp regions or for spraying the pulp during manufacture of an insulated conductor without substantially reducing the electrical insulating characteristics of the pulp.

8 Claims, 3 Drawing Figures

PULP INSULATION REPAIR

This invention is concerned with pulp insulation repair on electrically insulated conductors but is also concerned with the prevention from deterioration of pulp insulation.

In the manufacture of electrically insulated conductors, pulp insulation is sometimes used. One disadvantage found with pulp insulation is that during the course of its operational life, it becomes dry and brittle. When a splicer handles conductors, during a resplicing operation or to conduct a cable throw, dry and brittle pulp insulation will crack or even break away to expose the conducting member. In consequence, an electrical "short" may be caused between conducting members or between a conducting member and some other electrically conducting article in close proximity to it. In any case, the dielectric is impaired between conductors.

Various methods have been tried to repair pulp damage but with limited success. For instance coatings of various kinds applied to strengthen the pulp have resulted in reduction in dielectric between conducting members. Oil has also been used but this tends to make the pulp messy for handling purposes.

The applicant has discovered an efficient method of repairing pulp insulation and a compound for enabling the repair to be made. The invention also applies to the application of the compound to the pulp insulation of a conductor during its manufacture to prevent the deterioration of the pulp.

According to one aspect of the invention, there is provided a fibreless compound for use as a spray material, the compound comprising from 5.0 to 9.0 parts by weight of polyvinylpyrrolidone-polyvinylacetate copolymer, from 0.5 to 0.9 parts by weight of copper corrosion inhibitor and from 1.0 to 3.0 parts by weight of a plasticizer.

The copper corrosion inhibitor may be tolyltriazone and the plasticizer may be dibutyl phthalate.

It is found that a compound according to the formulation according to the invention, when sprayed onto fibrous material, tends to become attracted to the surfaces of the fibers so as to cover them with a compound layer which strengthens the fibers and the junction between fibers. It is also effective in forming new junctions between adjacent fibers so as to repair a crack appearing in pulp insulation. Further the compound may be used to coat individual pulp coated conductors and after drying of the compound, coatings on adjacent individual conductors do not tend to stick together.

In preferred compounds, one or more ingredients are included to accelerate the drying time of the compound after spraying or to increase the flame retardancy and reduce the conductivity of the dried compound. As examples of these materials, butyl cellosolve may be added to accelerate drying time while retarding film forming time towards the end of the drying operation. This enables compound to penetrate completely into the pulp before setting up. Butyl cellosolve in quantities around 2 parts by weight may be used with 10 to 40 parts by weight of methylene chloride which are suitable for flame retardance and 44–76 parts by weight of tetrahydrofuran which are suitable for reduction of conductivity. Alternatively to methylene chloride, 10 to 40 parts by weight of trichlorethylene is a suitable substitute. Also the tetrahydrofuran may be successfully replaced by 44 to 76 parts of a mixture of tetrahydrofuran and heptance in a ratio around 55:45 or a mixture of tetrahydrofuran and kerosene in a ratio around 60:40.

The invention also includes a method of repairing an electrically insulated conductor having a layer of pulp insulation overlying a conductor member comprising spraying the region to be repaired with the compound as defined above, the compound penetrating between and along the pulp fibers while avoiding the air spaces formed between fibers.

Further according to the invention, there is provided an electrically insulated conductor having a region of pulp insulation which has been repaired by the spray application of the compound as defined above.

The invention further includes a method of making an electrically insulated conductor in which a conducting member is insulated with a covering layer of pulp insulation and this is subsequently sprayed with a compound as defined above, the compound covering the individual fibers and penetrating between the fibers while substantially avoiding air spaces formed between the fibers.

In addition, the invention extends to include an electrically insulated conductor having a conducting member insulated with a covering layer of pulp insulation and the fibers of the pulp insulated being covered by the compound as defined above, the compound penetrating between fibers while substantially avoiding air spaces formed between fibers.

Embodiments of the invention will now be described, by way of example, with reference to the accompanying drawings, in which.

Figure 1:
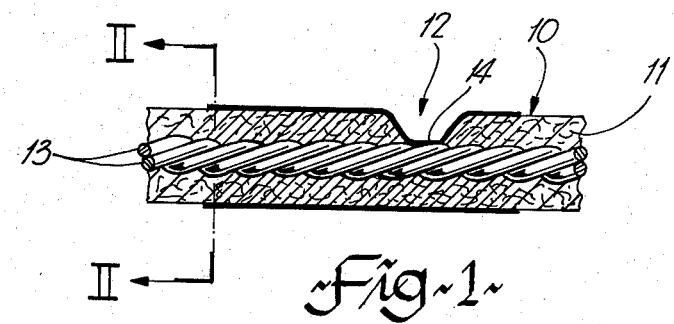
FIG. 1 is a longitudinal cross-sectional view of part of a conductor after repair.
Figure 2:
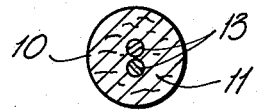
FIG. 2 is an axial cross-sectional view of the conductor along line II—II in FIG. 1.

In a first embodiment in FIG. 1, a conductor 10 in the form of a telecommunication cable is insulated by a layer of pulp insulation 11. During use of the conductor, the pulp insulation has become dry and brittle, partly because of moisture extraction by the use of dry air in the cable pressuring system extracting moisture from the pulp. The result of this is that the pulp is broken away and cracked in the region generally designated 12 during flexing as a resplicing operation is performed further along the cable.

To repair the region 12 and increase dielectric between the conductors, the region and areas of the pulp insulation axially at each side of the region are sprayed by a fibreless repair compound. This compound has the following formulation.

|  | Parts by Weight |
|---|---|
| Polyvinylpyrrolidone - Polyvinylacetate copolymer (PVP/PVA) | 10 |
| Tolyltriazone | 1 |
| Dibutyl Phthalate | 2 |

The above formulation is admixed with the following further ingredients in the following proportions:

|  | Volume per 100 gms. of copolymer |
|---|---|
| Butyl Cellosolve | 3 cc. |
| Methylene Chloride | 64 cc. |

| | Volume per 100 gms. of copolymer |
|---|---|
| Tetrahydrofuran | 120 cc. |

The compound is sprayed as a 5% solution onto the region 12 and surrounding areas from a distance of between 5 and 10 inches. It is found that the compound has a quality imparted to it by the PVP/PVA that when sprayed onto the pulp fibers, it is attracted to the surfaces of the fibers. Thus in the areas where pulp is present, the compound upon drying tends to strengthen the fibers and regions torn junctions between fibers. Some of the air gaps between fibers may still remain depending upon the degree of saturation by the compound. The butyl cellosolve, because of its solvent characteristics, accelerates the drying time to enable work to be done on the sprayed area if desired. A retardancy of film forming time enables the compound to penetrate completely into the pulp before setting up.

Complete penetration of the pulp enables the compound to penetrate into the pulp areas lying between pairs of conducting members 13 so as to repair any pulp insulation impairment between the conducting members. Hence, within the immediate spray area, the pulp is completely saturated, by surface coverage, with the compound and because of the flow capabilities of the compound the areas of pulp adjacent to the spray area also have amounts of the compound with the quantities of compound decreasing as the distance extends from the area of spray. As shown in FIG. 1, the thicker outlined fibers of the pulp insulation represent the areas infiltrated by the compound.

Also as may be seen from FIG. 1, the region 12 is devoid of pulp insulation to cause baring of the conducting members. The compound upon spraying onto the conducting members is capable of forming a film 14 over the members because no fibers are in the vicinity which may attract the compound and prevent it from film forming. The compound has insulating properties which satisfactorily increase the dielectric between the conducting members by film formation and also reinsulate the members from the outside of the cable. The strength properties of the film do not cause rupturing of the pulp if the conducting members are subsequently intentionally separated.

The further properties of the compound are such that it strengthens the pulp insulation in the area sprayed and provides this area with a degree of flexibility and plasticity which prevents the embrittlement. The flexibility also allows for the spray treated area to be used for some future splicing operation without fear of the pulp insulation breaking away from the conducting members in areas where it is not desired.

The compound described above and according to the invention is particularly useful for use on telecommunications cables where no temperature rise takes place as in power cables. Dielectric strength of pulp insulation is low and any range of high voltage will cause the breakdown of the insulation. The compound sprayed onto certain areas of insulation does not decrease the dielectric strength of the pulp to the extent that it will cause any significant increase in breakdown in the insulation. It is suspected that it may even increase dielectric strength.

Further, the compound does not interfere with the making of a connection to a conductor in the areas in which it is sprayed, by any of the standard wire connecting methods such as insulation displacement, piercing, etc.

Figure 3:
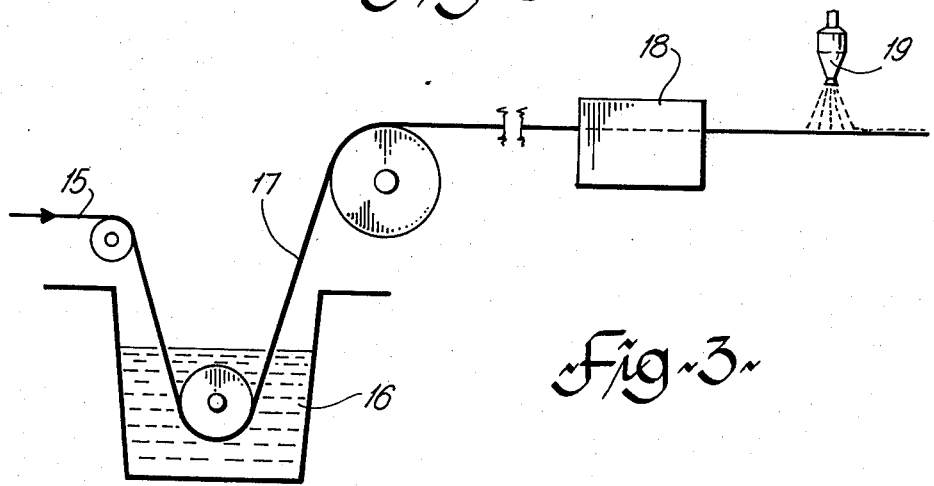
FIG. 3 is a diagrammatic view of apparatus for applying insulation to a conducting member in the manufacture of a conductor.

In a second embodiment, as shown in FIG. 3 a conducting member 15 is insulated during manufacture of a telecommunications cable by passing it through a pulp bath 16 in which it is coated with pulp. After being subjected to pulp finishing processes as well known in the art, the pulp covered conductor 17 is passed through a drying area 18 and then through a spray 19 of compound which covers and penetrates between the fibers as disclosed for the repair region in the first embodiment. A suitable formulation for the compound is as follows:

| | Parts By Weight |
|---|---|
| PVP/PVA | 10 |
| Tolytriazone | 1 |
| Dibutyl Phthalate | 2 (gms. or cc) |

The above formulation is mixed with 30 cc of isopropyl alcohol per 10 gms of PVP/PVA and then mixed with 140 cc of water per 10 gms. of PVP/PVA before spraying.

After the sprayed pulp is dried, it is found that the compound has infiltrated substantially evenly through the pulp while substantially avoiding air spaces to generally strengthen it and give it flexibility and plasticity which will prevent the pulp from becoming brittle after a period in use.

In use of the invention the proportions of PVP/PVA may be varied dependent upon particular requirements. For instance, where the compound is to be used for repair and in which pulp insulation has broken away so as to expose conducting members, a high molecular weight copolymer is required with a good film strength to provide a permanent covering film or layer over the exposed parts. It is also important that for repair work, the copolymer should be resistant to water solubility. Such a polymer should have a high percentage of PVP compared with PVA. For instance, in the first embodiment described, the ratio of PVP:PVA may be in the region of 60:40.

For the manufacture of insulated conductors, e.g. as in the second embodiment, the film strength requirements are not so important as the compound is to be sprayed solely on pulp and there are no exposed conducting members. Hence, the copolymer may be of low molecular weight with, for instance, the ratio of PVP:PVA lying anywhere between 70:30 to 30:70. It should be understood that water solubility increases with increase in proportion of PVA.

What is claimed is:

1. A fibreless compound for use as a spray material on pulp insulation consisting essentially of of an electrical conductor comprising from 5.0 to 9.0 parts by weight of polyvinylpyrrolidone-polyvinylacetate copolymer, from 0.5 to 0.9 parts by weight of a copper corrosion inhibitor and from 1.0 to 3.0 parts by weight of a plasticizer.

2. A compound according to claim 1 wherein the corrosion inhibitor is tolyltriazone.

3. A compound according to claim 1 wherein the plasticizer is dibutyl phthalate.

4. A compound according to claim 1 including a flame retardant.

5. A method of repairing an electrically insulated conductor having a layer of pulp insulation overlying a conducting member, comprising spraying the region to be repaired with the compound according to claim 1, the compound penetrating between and covering the individual pulp fibers while substantially avoiding air spaces between fibers.

6. An electrically insulated conductor having a region of pulp insulation which has been repaired by the spray application of the compound according to claim 1, and the fibers of the pulp having a covering of the compound which has penetrated between the fibers while substantially avoiding air spaces formed between the fibers.

7. A method of making an electrically insulated conductor in which a conducting member is insulated with a covering layer of pulp, the method comprising spraying the dried pulp with the compound defined in claim 1, the compound penetrating between and covering the individual fibers while substantially avoiding air spaces formed between the fibers.

8. An electrically insulated conductor having at least one conducting member insulated with a covering layer of pulp insulation and the fibers of the pulp having a covering of the compound according to claim 1 which has penetrated between the fibers while substantially avoiding air spaces formed between the fibers.

* * * * *

UNITED STATES PATENT AND TRADEMARK OFFICE
CERTIFICATE OF CORRECTION

PATENT NO. : 4,291,094

DATED : September 22, 1981

INVENTOR(S) : William P. Trumble

It is certified that error appears in the above—identified patent and that said Letters Patent is hereby corrected as shown below:

Claim 1 should read as shown below;

-- 1. A fibreless compound for use as a spray material on pulp insulation of an electrical conductor consisting essentially of from 5.0 to 9.0 parts by weight of polyvinylpyrrolidone-polyvinylacetate copolymer, from 0.5 to 0.9 parts by weight of a copper corrosion inhibitor and from 1.0 to 3.0 parts by weight of a plasticizer. --.

Signed and Sealed this

Fifth Day of January 1982

[SEAL]

Attest:

GERALD J. MOSSINGHOFF

Attesting Officer     Commissioner of Patents and Trademarks